US00RE40945E

(19) United States
(12) Reissued Patent
Hsu et al.

(10) Patent Number: US RE40,945 E
(45) Date of Reissued Patent: Oct. 27, 2009

(54) INCREASING SCANNING RESOLUTION THROUGH DRIVING SYSTEM CONTROL

(76) Inventors: Chuan-Yu Hsu, No. 26, Zhucun 2nd Rd, Hsinchu City 300 (TW); Chen-Hsiang Shih, 10F, No. 8, Lane 86, Heping Rd., Hsinchu City 300 (TW)

(21) Appl. No.: 11/357,895

(22) Filed: Feb. 17, 2006

Related U.S. Patent Documents

Reissue of:
(64) Patent No.: 6,693,730
Issued: Feb. 17, 2004
Appl. No.: 09/518,117
Filed: Mar. 3, 2000

(30) Foreign Application Priority Data

Jan. 15, 2000 (TW) ..... 89100599

(51) Int. Cl.
*H04N 1/04* (2006.01)

(52) U.S. Cl. ..... 358/474; 358/1.2; 358/497; 358/483; 358/530; 358/475; 348/97; 347/252

(58) Field of Classification Search ..... 358/474, 358/497, 486, 475, 509, 1.2, 505, 1.9, 483; 348/97; 347/252
See application file for complete search history.

(56) References Cited

U.S. PATENT DOCUMENTS

| | | | | | |
|---|---|---|---|---|---|
| 5,150,227 | A | * | 9/1992 | Koshiyouji et al. | 358/497 |
| 5,381,244 | A | * | 1/1995 | Kamiyama | 358/486 |
| 6,215,513 | B1 | * | 4/2001 | Ashikaga | 347/252 |
| 2001/0030687 | A1 | * | 10/2001 | Kondo et al. | 348/97 |
| 2002/0097446 | A1 | * | 7/2002 | Lee | 358/406 |

* cited by examiner

*Primary Examiner*—Edward L Coles
*Assistant Examiner*—Negussie Worku
(74) *Attorney, Agent, or Firm*—Stolowitz Ford Cowger LLP

(57) ABSTRACT

A method of increasing the scanning resolution of a scanner through controlling its driving system. By suitably adjusting the timing relationship between motor pulses and exposure pulses, a low-resolution driving system can produce a high-resolution image with no additional production cost incurred.

14 Claims, 2 Drawing Sheets

INCREASING SCANNING RESOLUTION THROUGH DRIVING SYSTEM CONTROL

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to a method of controlling the scanning resolution of a scanner. More particularly, the present invention relates to a method of increasing the scanning resolution of a scanner through control of its driving system.

2. Description of Related Art

Due to the many recent advances in computer multimedia technologies, image-processing techniques have gone forward a giant step, leading to some innovative designs for computer peripheral products such as a scanner. In a few years' time, the scanner has developed from a palm-top device capable of scanning only black and white pixels to a full-color high-resolution scanning system. In general, the resolution of a scanner along the horizontal axis depends on the density of its charge-coupled device (CCD) while the resolution of the scanner along the vertical axis depends on the level of precision of its driving system.

To increase resolution along the vertical axis, the following methods are conventionally adopted:

(a) Driving System Modification:

FIG. 1 is a timing diagram showing shift gate clock (SH) pulse and motor pulse (MTP) provided by the driving system of a conventional scanner. As shown in FIG. 1, one SH pulse period is represented by T1, which is the time needed to expose a scanner's CCD once. Typically, a period T1 is about 10 ms. The motor pulses are signals for controlling the forward rotation of a stepper motor. In general, the smaller the stepping angle of the stepper motor, the higher the resolution of the scanner is. Hence, by using a stepper motor having a small stepping angle, a high scanning resolution can be obtained. However, the cost of making a stepper motor with a small stepping angle is relatively high.

In addition, when the scanner is performing low resolution scanning operations, pulsing rate or pulse per second (PPS) of the stepper motor increases, leading to a low torque. Low torque increases the probability of stepping loss, thereby resulting in distortion of the scanned image.

(b) Pixel Compensation:

This method relies on displaying an image formed on the CCD in a single exposure twice on a screen in each exposure cycle. Hence, resolution is doubled. However, the image thus obtained is no longer the real optical resolution.

(c) Micro-stepping Motion Control:

This method relies on the addition of an external driving circuit so that the original stepper motor is changed to a stepper motor capable of stepping forward in ½, ¼ or ⅛ of a step each time. Through the reduction of each forward step, resolution along the vertical axis is increased. However, the minimum micro-step that can be driven is ultimately limited by the external circuit. Moreover, when an ordinary step is subdivided into too many micro-steps, control becomes very difficult. The outcome is that distortion of the scanned image is unavoidable.

SUMMARY OF THE INVENTION

Accordingly, one object of the present invention is to provide a drive control system capable of increasing the scanning resolution of a scanner. The system operates by adjusting the timing relationship between motor pulse and shift gate clock pulse so that a low resolution driving system can achieve a high-resolution scanning.

A second object of the invention is to provide a driving system capable of increasing scanning resolution without increasing the production cost a scanner.

To achieve these and other advantages and in accordance with the purpose of the invention, as embodied and broadly described herein, the invention provides a method for increasing the scanning resolution of a scanner through control of its driving system. Shift gate clock pulses for the charge-coupled device of a scanner are provided so that one clock pulse cycle is a period of exposure of the charge-coupled device. Motor pulses are also provided. However, one motor pulse cycle is equivalent to a multiple of shift gate clock pulse cycles.

In a second embodiment, a method for increasing the scanning resolution of a scanner through controlling its driving system is provided. Motor pulse signals are supplied to the driving motor of the scanner. In addition, shift gate clock pulses are supplied to the charge-coupled device of the scanner. The motor pulses and the shift gate clock pulses are adjusted so that multiple motor pulses are emitted for every shift gate clock pulse going to the charge-coupled device.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
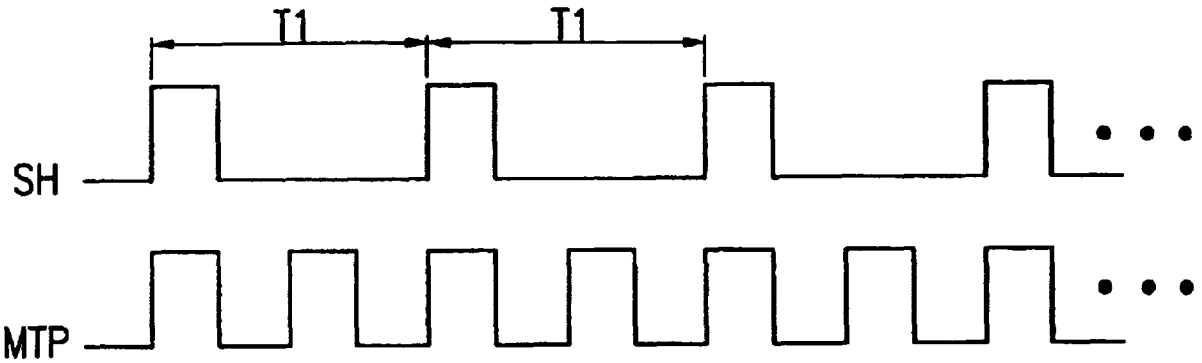
FIG. 1 (PRIOR ART)
FIG. 1 is a timing diagram showing the shift gate clock pulse and the motor pulse provided by the driving system of a conventional scanner.

Reference will now be made in detail to the present preferred embodiments of the invention, examples of which are illustrated in the accompanying drawings. Wherever possible, the same reference numbers are used in the drawings and the description to refer to the same or like parts.

In order to increase scanning resolution of the vertical axis, scanner manufacturers often stress the importance of controlling the stepper motor in their research so that stepper motors capable of having ever-decreasing steps and ever-increasing stability are provided. However, they always come up against a limitation when designing the driving system of their scanners.

In this invention, the scanning resolution of a scanner is increased by reducing motor pulse cycles per period. By reducing the number of motor pulse cycles per period, a plurality of shift gate clock pulses are generated for each forward step taken by the stepper motor.

Figure 2:
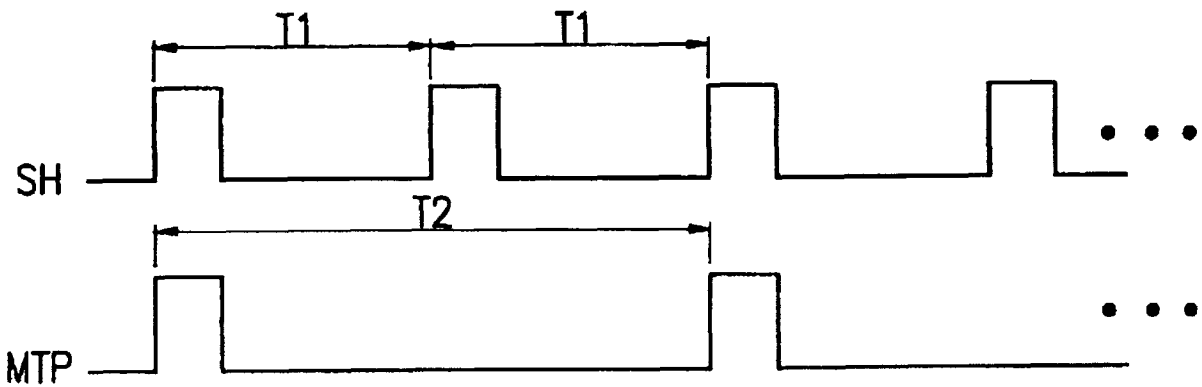
FIG. 2 is a timing diagram showing the shift gate clock pulse and the motor pulse provided by the driving system of a scanner according to this invention.

FIG. 2 is a timing diagram showing the shift gate clock pulse and the motor pulse provided by the driving system of a scanner according to this invention. As shown in FIG. 2, a single motor pulse is emitted for every two shift gate clock pulses. Here, a shift gate clock pulse submitted to the charge-coupled device (CCD) still has a duration T1. However, two shift gate clock pulses are generated for each motor pulse, and thus two scanning operations are carried out within each motor pulse cycle. Hence, near optical resolution of the scanners can be obtained without incurring additional cost for producing the scanner.

Figure 3:
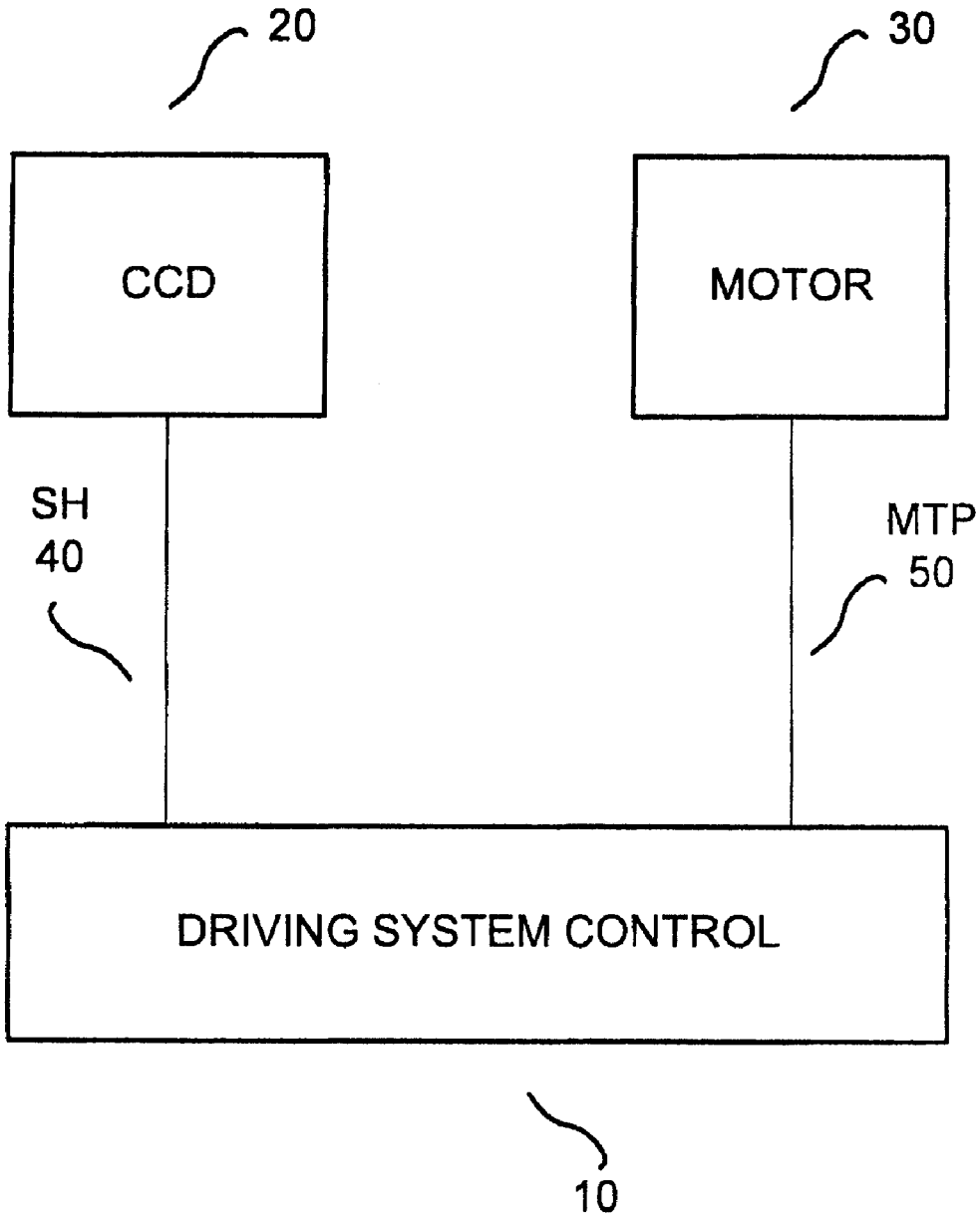
FIG. 3 is a schematic diagram of the driving system control according to the present invention.

FIG. 3 is a schematic diagram of a scanner showing the driving system control 10 sending the motor pulse (MTP) 50 to the motor 30 and shift gate clock pulse (SH) 40 to the CCD 20 according to this invention.

Tables 1, 2 and 3 below illustrate the improvement in scanning resolution resulting from a modification of the driving system in a conventional scanner.

Exposure time: 10 ms

Scanning mode: Grey scale

Optical resolution: 600 (horizontal axis) dpi

TABLE 1

| Original design | | | |
|---|---|---|---|
| Resolution (Vertical Axis) | Motor Pulse Cycle | Number of Exposures | Pulse Per Second (PPS) |
| 75 dpi | 8 | 1 | 800 |
| 600 dpi | 1 | 1 | 100 |
| 1200 dpi | 0.5 | 1 | 50 |
| 2400 dpi | X | X | X |

In Table 1, the stepper motor in the driving system operates according to a 600 dpi specification. In other words, the stepper motor steps through 600 increments to move forward an inch. To attain a higher resolution of 1200 dpi in the vertical axis, the motor must step forward half a step at a time. However, to attain an even higher resolution such as 2400 dpi is almost impossible unless a driving circuit capable of driving the stepper motor forward through one quarter of the original micro-step is available.

Exposure time: 10 ms

Scanning mode: Grey scale

Optical resolution: 600 (horizontal axis) dpi

TABLE 2

| Change in the driving system | | | |
|---|---|---|---|
| Resolution (Vertical Axis) | Motor Pulse Cycle | Number of Exposures | Pulse Per Second (PPS) |
| 75 dpi | 16 | 1 | 1600 |
| 600 dpi | 2 | 1 | 200 |
| 1200 dpi | 1 | 1 | 100 |
| 2400 dpi | 0.5 | 1 | 50 |

In Table 2, the stepper motor in the driving system has changed so that the motor now operates according to a 1200 dpi specification. In other words, the stepper motor steps through 1200 increments to move forward an inch. To attain a higher resolution of 2400 dpi in the vertical axis, the motor must step forward half a step at a time. However, when the scanner is performing a low-resolution scanning operation, the number of pulses per second (PPS) is greatly increased. Since torque produced by the stepper motor drops when PPS is increased, distortion of the scanned image may occur.

Exposure time: 10 ms

Scanning mode: Grey scale

Optical resolution: 600 (horizontal axis) dpi

TABLE 3

| Driving system according to this invention | | | |
|---|---|---|---|
| Resolution (Vertical Axis) | Motor Pulse Cycle | Number of Exposures | Pulse Per Second (PPS) |
| 75 dpi | 8 | 1 | 800 |
| 600 dpi | 1 | 1 | 100 |
| 1200 dpi | 1 | 2 | 50 |
| 2400 dpi | 1 | 4 | 25 |

In Table 3, the stepper motor in the driving system uses the original design and operates according to a 600 dpi specification. In other words, the stepper motor steps through 600 increments to move forward an inch. To attain a higher resolution of 1200 dpi in the vertical axis, pulse cycle of the stepper motor is increased so that CCD exposures are conducted twice within each motor pulse cycle. When resolution of the vertical axis is increased to 2400 dpi, pulse cycle of the stepper motor is further increased so that CCD exposures are conducted four times within each motor pulse cycle.

In summary, this invention provides a method of increasing scanning resolution by suitably adjusting the timing relationship between the motor pulse and the shift gate clock pulse that controls the number of CCD exposures. Hence, a low-resolution driving system is capable of producing a high-resolution scanning. A second advantage of this invention is that scanning resolution is improved without incurring additional cost in producing the scanner.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of increasing scanning resolution of a scanner through controlling its driving system, comprising the steps of:

providing shift gate clock pulses to a charge-coupled device such that one shift gate clock pulse period corresponds to an exposure cycle for the charge-coupled device; and providing motor pulses to a motor such that one motor pulse period corresponds to a plurality of exposure cycles for the charge-coupled device.

2. The method of claim 1, wherein the motor includes a stepper motor.

3. A method of increasing scanning resolution of a scanner through controlling its driving system, comprising the steps of:

providing motor pulse signals to a driving motor of the scanner;

providing shift gate clock pulse signals to a charge-coupled device of the scanner; and adjusting a timing relationship between the motor pulse and the shift gate clock pulse such that one motor pulse cycle corresponds to a plurality of shift gate clock pulse cycles.

4. The method of claim 3, wherein one shift gate clock cycle corresponds to an exposure cycle for the charge-coupled device.

5. The method of claim 3, wherein the motor includes a stepper motor.

*6. The method of claim 1, further comprising providing motor pulses to a motor such that one motor pulse period corresponds to two exposure cycles for the charge-coupled device.*

*7. The method of claim 3, further comprising adjusting a timing relationship between the motor pulse and the shift gate clock pulse such that one motor pulse cycle corresponds to four shift gate clock pulse cycles.*

*8. An apparatus, comprising:*

*a driving controller of a scanning device having a driving motor and a charge-coupled device, said driving controller adapted to:*

*provide motor pulse signals to the driving motor;*

*provide shift gate clock pulse signals to the charge-coupled device; and*

*adjust a timing relationship between the motor pulse and the shift gate clock pulse such that one motor pulse cycle corresponds to a plurality of shift gate clock pulse cycles.*

*9. The apparatus of claim 8, wherein said driving controller is further adapted to:*

*adjust the timing relationship between the motor pulse and the shift gate clock pulse such that one shift gate clock cycle corresponds to an exposure cycle for the charge-coupled device.*

*10. The apparatus of claim 8, wherein the motor comprises a stepper motor.*

*11. The apparatus of claim 8, wherein said driving controller is further adapted to:*

*adjust a timing relationship between the motor pulse and the shift gate clock pulse such that one motor pulse cycle corresponds to two shift gate clock pulse cycles.*

*12. An apparatus, comprising:*

*a scanner driving system of a scanner, adapted to:*

*provide shift gate clock pulses to a charge-coupled device of the scanner such that one shift gate clock pulse period corresponds to an exposure cycle for the charge-coupled device; and*

*provide motor pulses to a motor of the scanner such that one motor pulse period corresponds to a plurality of exposure cycles for the charge-coupled device.*

*13. The apparatus of claim 12, wherein the motor comprises a stepper motor.*

*14. The apparatus of claim 12, wherein said scanner driving system is further adapted to:*

*provide motor pulses to a motor of the scanner such that one motor pulse period corresponds to four exposure cycles for the charge-coupled device.*

* * * * *